US008287108B2

(12) United States Patent
Uehara et al.

(10) Patent No.: US 8,287,108 B2
(45) Date of Patent: Oct. 16, 2012

(54) SEALING METHOD OF REMANUFACTURED LIQUID CONTAINER

(75) Inventors: Yasunao Uehara, Matsumoto (JP); Yuichi Seki, Matsumoto (JP); Masahide Matsuyama, Higashichikuma-gun (JP); Yasuhiro Ogura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 931 days.

(21) Appl. No.: 12/114,318

(22) Filed: May 2, 2008

(65) Prior Publication Data

US 2008/0284833 A1 Nov. 20, 2008

(30) Foreign Application Priority Data

May 2, 2007 (JP) ................................. 2007-121712

(51) Int. Cl.
*B41J 2/175* (2006.01)
*B32B 9/04* (2006.01)

(52) U.S. Cl. ...................................... 347/86; 428/411.1

(58) Field of Classification Search ........................ None
See application file for complete search history.

(56) References Cited

U.S. PATENT DOCUMENTS 6,364,473 B1 4/2002 Liu
6,416,152 B1 7/2002 Matsuzaki et al.
2001/0017640 A1* 8/2001 Inada et al. ..................... 347/84
2003/0124283 A1* 7/2003 Kawamura et al. .......... 428/35.7
2005/0041079 A1* 2/2005 Saito .............................. 347/86
2006/0132555 A1* 6/2006 Uehara et al. .................. 347/85

FOREIGN PATENT DOCUMENTS

EP 1 527 882 A2 5/2005
EP 1 661 710 A2 5/2006
JP 3-118670 U 12/1991
JP 9-123472 A 5/1997
JP 9-207352 A 8/1997
JP 9-240005 A 9/1997
WO WO 2007/142263 A1 12/2007

* cited by examiner

*Primary Examiner* — Matthew Luu
*Assistant Examiner* — Erica Lin
(74) *Attorney, Agent, or Firm* — Sughrue Mion, PLLC

(57) ABSTRACT

A method for sealing an ink cartridge is disclosed. A cover film is bonded to the ink cartridge in such a manner as to cover an ink inlet hole formed in the ink cartridge. An opening is formed in the cover film in such a manner as to communicate with the hole of the ink cartridge. The method includes preparing a seal film and bonding the seal film to the cover film with a bonding strength smaller than the bonding strength of the cover film with respect to the ink cartridge in such a manner that the seal film becomes peelable from the cover film, thereby sealing the opening of the cover film.

6 Claims, 9 Drawing Sheets

SEALING METHOD OF REMANUFACTURED LIQUID CONTAINER

CROSS-REFERENCE TO RELATED APPLICATION

This application is based upon and claims the benefit of priority from prior Japanese Patent Application No. 2007-121712, filed on May 2, 2007, the entire content of which is incorporated herein by reference.

BACKGROUND

1. Technical Field

The present invention relates to a method of liquid container, a method of manufacturing liquid container, a liquid container, remanufacturing method of liquid container, and remanufactured liquid container.

2. Related Art

As a liquid container, an ink cartridge removably mounted in an inkjet printer (hereinafter, referred to as a printer), which is a type of liquid ejection apparatus, for example, is known. The ink cartridge has a container body with a substantially flat box-like shape. An ink chamber is defined in the-container body to receive ink, which is liquid. An ink inlet hole is formed in a lower surface of the container body to allow initial filling of the ink into the ink chamber. An ink supply hole is also provided in the lower surface of the container body to receive an ink supply needle with the ink cartridge secured to the printer. To suppress leakage of the ink from the ink inlet hole and the ink supply hole, a cover film is bonded to the lower surface of the container body in such a manner as to seal the ink inlet hole and the ink supply hole.

After the ink cartridge is mounted in the printer, the printer consumes the ink through printing. This reduces the amount of the ink retained in the ink chamber until the ink cartridge becomes completely empty. The used ink cartridge is replaced by a new ink cartridge. The container body of the used ink cartridge is still usable for multiple cycles after the ink cartridge is removed from the printer. As disclosed in Japanese Registered Utility Model No. 3118670, a used ink cartridge may be remanufactured as a reusable ink cartridge by refilling the container body of the ink cartridge with ink. Such technique addresses to efficient use of resources and preservation of environments.

According to the technique of the above utility model, an opening is formed in the cover film at a position corresponding to the ink inlet hole using a piercing jig, before the used ink cartridge is refilled with ink. Then, a syringe, for example, is inserted into the ink inlet hole through the opening in the cover film to introduce the ink refill into the container body. Another film (a seal film) is then mounted on the cover film to close the opening and heated to be bonded to the cover film having the opening. In this manner, the opening is sealed and the ink is prevented from leaking from the opening.

To mount a new ink cartridge in the printer, an opening is formed in a portion of the cover film corresponding to the ink supply hole by an ink supply needle. Thus, after a used ink cartridge is refilled with ink, a seal film is welded to the cover film in such a manner that the seal film seals the opening in the cover film corresponding to the ink supply hole, in addition to the opening in the cover film corresponding to the ink inlet hole. When the thus remanufactured ink cartridge is installed in the printer, the ink supply needle penetrates the seal film and is received in the ink supply hole. This structure allows the ink to be supplied from the ink cartridge to the printer through the ink supply needle.

However, after the above-described remanufacturing procedure is repeatedly performed on the same ink cartridge, a plurality of seal films are welded to the cover film in a stacked state. The thickness of the stacked seal films as a whole is thus increased by the amount corresponding to the number of the repeated remanufacturing cycles. This changes the outer shape the ink cartridge, which may disadvantageously hamper, for example, installation of the ink cartridge at an optimal position with respect to the printer.

Further, the ink contaminates the cut pieces of the cover film (or the seal film) of the used ink cartridge that are formed around the opening formed by the ink supply needle. Prior to refilling the used ink cartridge with the ink, the portion of the cover film (or the seal film) around the opening is cleansed to remove the ink contaminating the cut pieces. However, after the ink cartridge is subjected to at least one cycle of remanufacturing, one or more seal films are provided on the cover film. If the seal films are stacked, ink may be caught between the cut pieces of an adjacent pair of the stacked films. Since it is not easy to cleanse and remove ink from between the stacked cut pieces, some of the ink may remain at the site without being removed. Thus, when the used ink cartridge is recovered and refilled with ink refill, the remaining used ink may mix with the new ink, or the ink refill, thus changing the composition of the ink.

SUMMARY

Accordingly, it is an objective of the present invention to provide a liquid container that can be remanufactured with a highly reliable sealing performance without changing the outer shape and the composition of the liquid received in the liquid container, a method for remanufacturing the liquid container, and a method for sealing the liquid container.

To achieve the foregoing objective and in accordance with a first aspect of the present invention, a method for sealing a liquid container is provided. The cover film is bonded to the liquid container in such a manner as to cover a hole formed in the liquid container. An opening is formed in the cover film in such a manner as to communicate with the hole of the liquid container. The method includes: preparing a seal film; and bonding the seal film to the cover film with a bonding strength smaller than the bonding strength of the cover film with respect to the liquid container in such a manner that the seal film is peelable from the cover film, thereby sealing the opening of the cover film.

In accordance with a second aspect of the present invention, a liquid container that includes a hole forming surface in which a hole is formed, a cover film bonded to the hole forming surface in a such manner as to cover the hole, and a seal film sealing the opening of the cover film is provided. The cover film has an opening communicating with the hole. The seal film is bonded to the cover film in such a manner that the seal film becomes peelable from the cover film.

In accordance with a third aspect of the present invention, a method for manufacturing a liquid container is provided. A cover film is bonded to the liquid container in such a manner as to cover a hole formed in the liquid container. An opening is formed in the cover film in such a manner as to communicate with the hole of the liquid container. The method includes: filling the liquid container with a liquid; preparing a seal film; and bonding the seal film to the cover film with a bonding strength smaller than the bonding strength of the cover film with respect to the liquid container in such a manner that the seal film becomes peelable from the cover film, thereby sealing the opening of the cover film.

In accordance with a fourth aspect of the present invention, a method for remanufacturing a used liquid container is provided. A cover film is bonded to the liquid container in such a manner as to cover a hole formed in the liquid container. An opening is formed in the cover film in such a manner as to communicate with the hole of the liquid container. The method includes: refilling the used liquid container with a liquid; preparing a seal film; and bonding the seal film to the cover film with a bonding strength smaller than the bonding strength of the cover film with respect to the liquid container in such a manner that the seal film becomes peelable from the cover film, thereby sealing the opening of the cover film.

In accordance with a fifth aspect of the present invention, a remanufactured liquid container refilled with a liquid is provided. The liquid container includes a cover film bonded to the liquid container to cover a hole formed in the liquid container and a seal film bonded to the cover film in such manner as to seal the opening of the cover film. The cover film has an opening communicating with the hole. The seal film is bonded to the cover film with a bonding strength smaller than the bonding strength of the cover film with respect to the liquid container in such a manner that the seal film becomes peelable from the cover film.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF EXEMPLARY EMBODIMENTS

An embodiment of the present invention will now be described with reference to FIGS. 1 to 12. In the following description, the "front-and-rear direction", the "left-and-right" direction, and the "up-and-down" direction are the directions indicated by the corresponding arrows in FIGS. 1 to 4.

Figure 2:
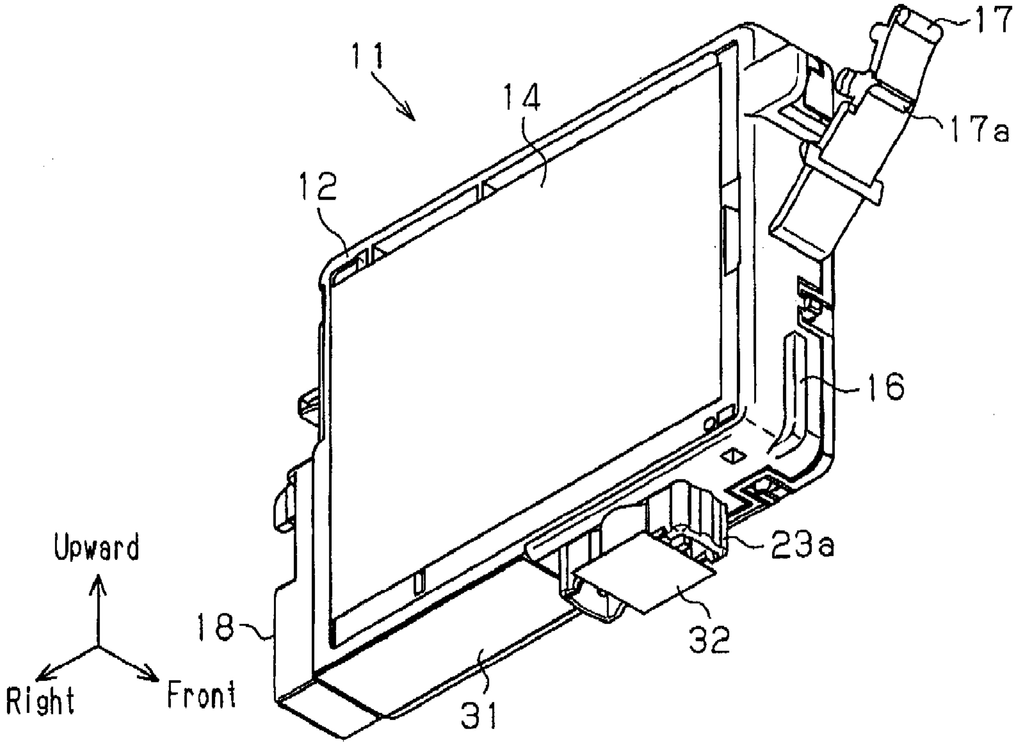
FIG. 2 is a rear perspective view showing the ink cartridge shown in FIG. 1.
Figure 3:
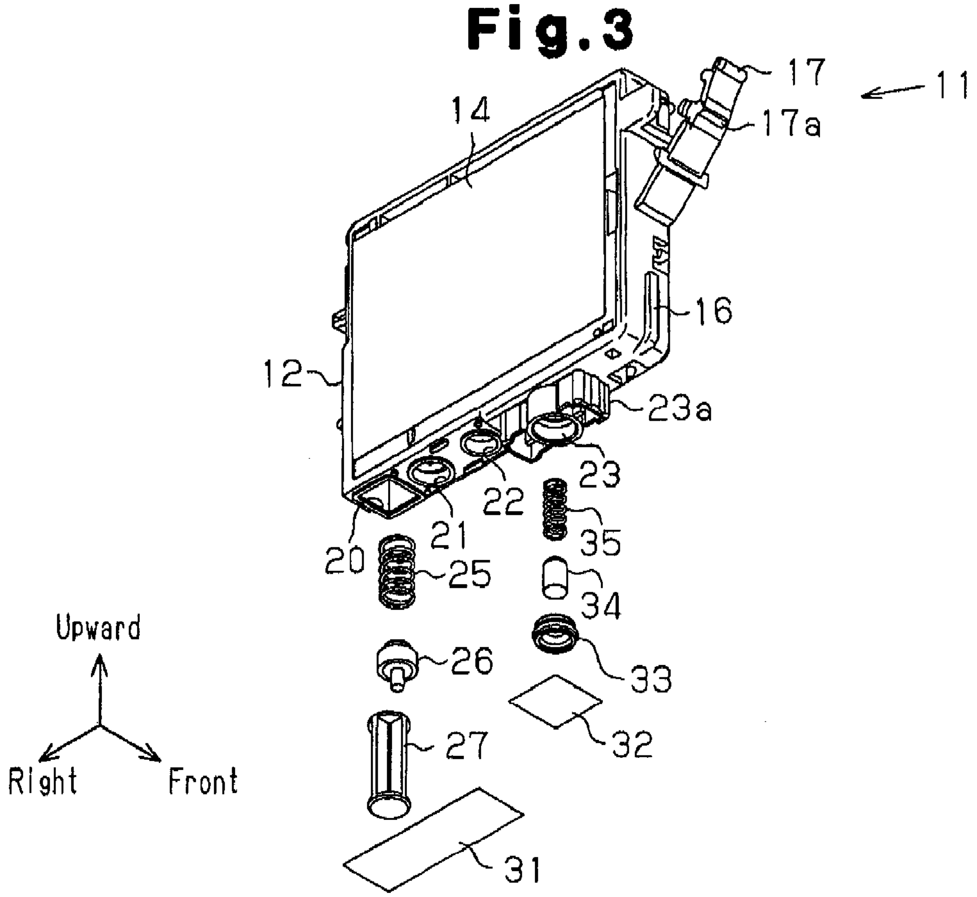
FIG. 3 is a partially exploded perspective view showing the ink cartridge shown in FIG. 2.
Figure 4:
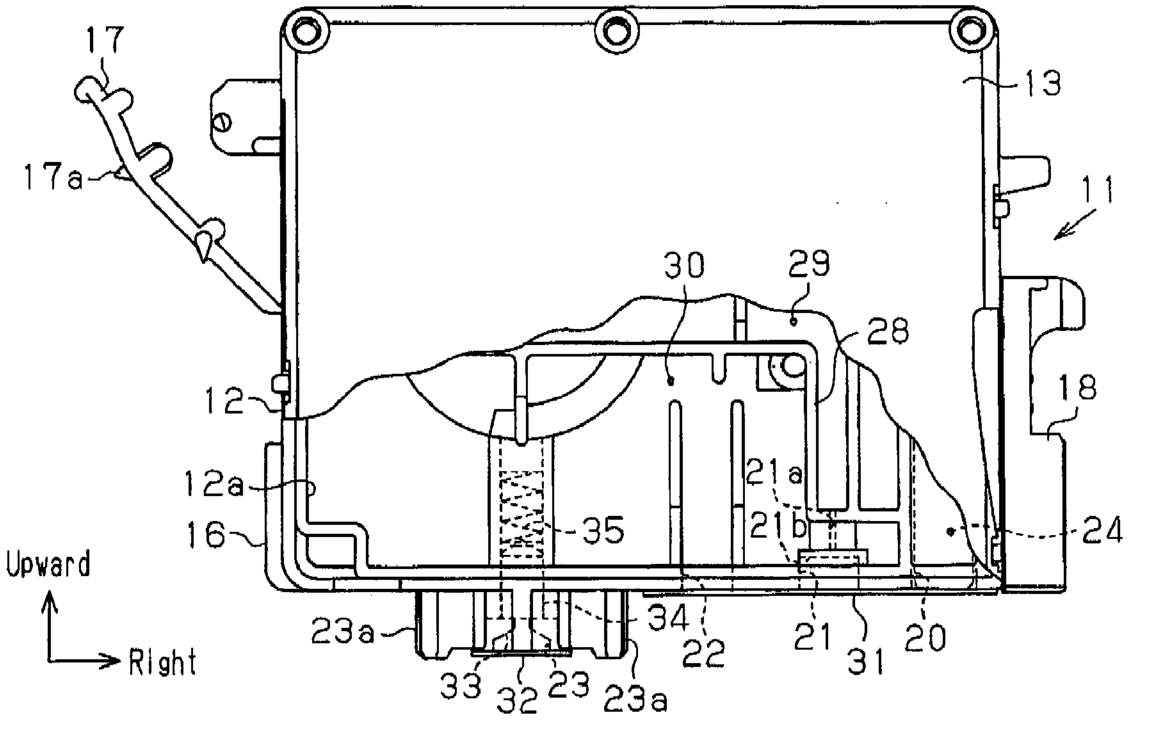
FIG. 4 is a front view, with a part cut away, showing the ink cartridge shown in FIG. 1.

As shown in FIGS. 1 to 4, an ink cartridge 11, or a fluid container of the illustrated embodiment, includes a container body 12, which is shaped substantially like a flat rectangular box and formed of synthetic resin, which is, for example, polypropylene (PP). With reference to FIG. 4, an opening 12*a* is formed in a front surface of the container body 12. A film member (not shown), which is formed of thermally adhesive material, is welded to the container body 12 to substantially cover the entire opening 12*a*. A lid body 13 is detachably attached to the container body 12 from outside the film member (the side corresponding to the front surface) in such a manner that the opening 12*a* is shielded. A film member 14, which is formed of thermally adhesive material, is bonded to a rear surface of the container body 12 to substantially cover the entire rear surface. An elongated ID label 15, which represents the color of the ink, or the fluid, contained in the ink cartridge 11, is welded to an upper surface of the container body 12.

As shown in FIGS. 2 to 4, a guide projection 16 extending in the up-and-down direction projects from a lower portion of a left surface of the container body 12. If the ink cartridge 11 is mounted in a cartridge holder (not shown) of an inkjet printer (hereinafter, referred to as a printer), which is a type of fluid ejection apparatus, the guide projection 16 is received in a guide recess (not shown) formed in the cartridge holder. This guides the ink cartridge 11 when the ink cartridge 11 is mounted in the cartridge holder.

With reference to FIGS. 1 to 4, an elastically deformable engagement lever 17, which projects diagonally to the upper left, is arranged at a position above the guide projection 16 on the left surface of the container body 12. An engagement piece 17*a*, which extends horizontally (in the front-and-rear direction), projects substantially from the longitudinal center of the engagement lever 17 on a surface of the engagement lever 17. Thus, when the ink cartridge 11 is mounted in the cartridge holder of the printer, the engagement lever 17 elastically deforms and the engagement piece 17*a* becomes engaged with a portion of the cartridge holder. This positions the ink cartridge 11 with respect to the cartridge holder. The ink cartridge 11 is thus secured to the cartridge holder in the positioned state.

Figure 1:
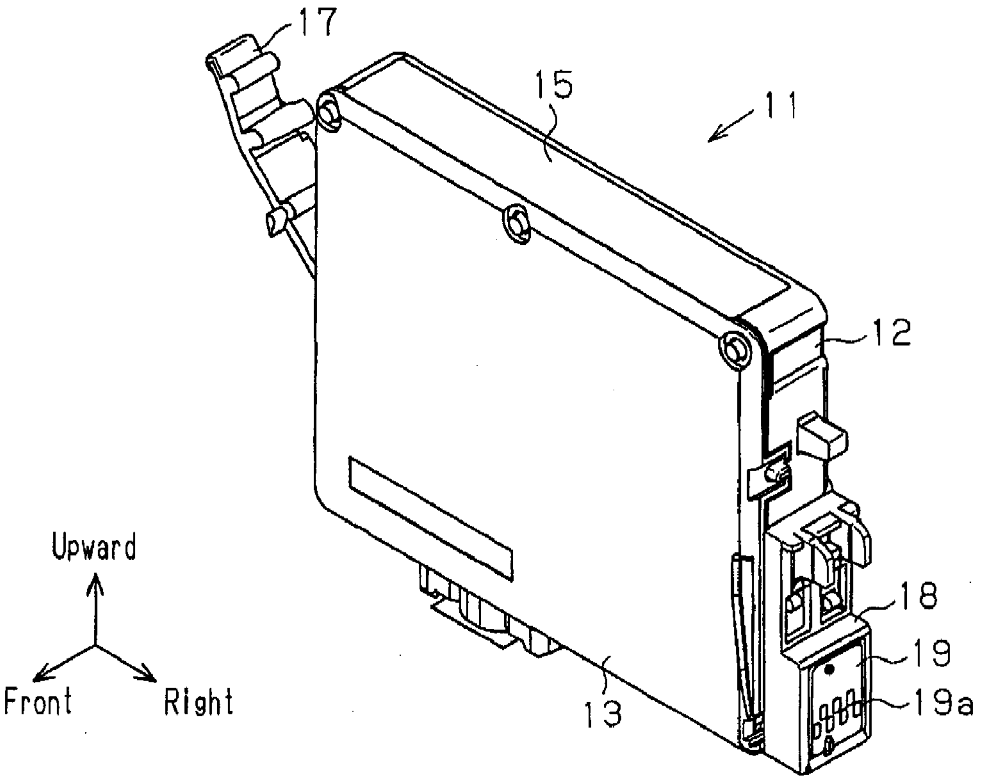
FIG. 1 is a front perspective view showing a new ink cartridge according to one embodiment of the present invention.

As shown in FIG. 1, a substrate unit 18 is secured to a lower portion of a right surface of the container body 12. A circuit substrate 19 on which a semiconductor memory device is mounted is arranged on a surface of the substrate unit 18. The semiconductor memory device of the circuit substrate 19 stores various information regarding the ink cartridge 11 (for example, information regarding ink colors and ink containing amounts). Terminals 19*a* are provided on the surface of the circuit substrate 19. When the ink cartridge 11 is mounted in the cartridge holder of the printer, the terminals 19*a* contact connection terminals formed in the cartridge holder. This transfers various information between the circuit substrate 19 and a control device (not shown) of the printer.

As illustrated in FIGS. 3 and 4, a rectangular opening 20, a first ink inlet hole 21 having a circular shape, a second ink inlet hole 22 having a circular shape, and an ink supply port 23 having a circular shape are formed in a lower surface (a hole forming surface S) of the container body 12 and arranged in this order from the right end to the left end of the lower surface. The ink supply port 23 has a pair of guide walls 23*a* each having a substantial U shape, which are provided at the right end and the left end of the ink supply port 23. The interior of the opening 20 defines an atmospheric air communication chamber 24, which configures a portion of an atmospheric air communication passage. The atmospheric air communication chamber 24 communicates with the exterior of the container body 12, or the atmospheric air, through a non-illustrated atmospheric air exposure port. The atmospheric air communication chamber 24 accommodates a coil spring 25, a valve body 26, and a valve support member 27 in this order from inward to outward.

A rib 28 defines an upper ink chamber 29 and a lower ink chamber 30 in the container body 12. The first ink inlet hole 21 communicates with the upper ink chamber 29 and the lower ink chamber 30 through a narrow passage 21*a* and a narrow ink inlet port 21*b*, which are formed in the container body 12. The second ink inlet hole 22 communicates directly with the lower ink chamber 30. In initial filling of the ink chambers 29, 30, ink is introduced through the ink inlet holes 21, 22. After such initial filling, the first and second ink inlet holes 21, 22 are sealed by a cover film 31 along with the opening 20 as illustrated in FIGS. 2 to 4.

Figure 6:
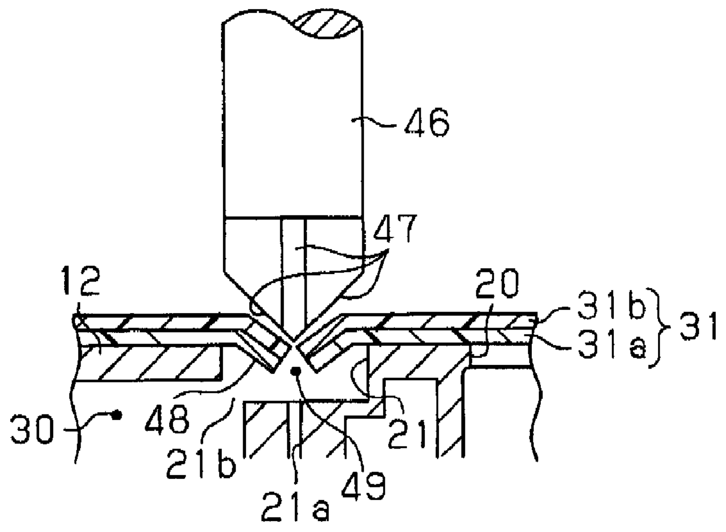
FIG. 6 is a cross-sectional view showing a portion of the ink cartridge that has been subjected to a piercing step.
Figure 7:
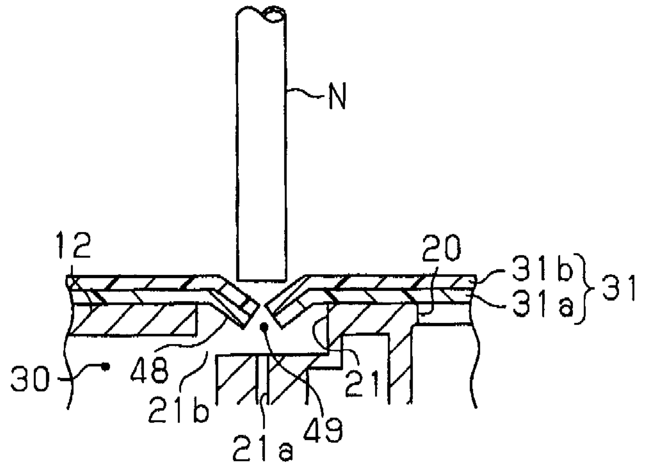
FIG. 7 is a cross-sectional view showing a portion of the ink cartridge when the ink is supplied to the ink cartridge through the opening.

The cover film 31 has a two-layer structure formed by a bonding layer film 31*a* and a surface layer film 31*b*. As illustrated in FIGS. 6 and 7, the bonding layer film 31*a* is welded to a lower surface of the container body 12. In this state, the surface layer film 31*b* is arranged on the bonding layer film 31*a* in such a manner that the surface layer film. 31*b* is exposed to the exterior. As the bonding layer film 31*a*, a polyolefin-based film (a PO-based film) that melts at a predetermined temperature and exhibits improved welding performance, or a film formed of a resin material of the same type as the resin material forming the container body 12 of the ink cartridge 11, may be employed. If the container body 12 of the ink cartridge 11 is formed of an ester-based resin material, the bonding layer film 31*a* is formed of a resin material of the same type as the material of the container body 12, which is the ester-based resin material.

The surface layer film 31*b* is formed of a polyethylene-terephthalate-based film (a PET-based film) or a nylon-based film (a NY-based film) that do not melt at the melting point of the bonding layer film 31*a* and exhibits enhanced heat resistance compared to the bonding layer film 31*a*. In other words, the surface layer film 31*b* is formed of a resin material of a type different from the type of the resin material forming the container body 12 and the bonding layer film 31*a*.

When the ink cartridge 11 is mounted in the cartridge holder of the printer, a hollow ink supply needle 39 (see FIG. 11), which is provided in the cartridge holder, is inserted through the ink supply hole 23 serving as a liquid supply hole. As shown in FIGS. 2 and 3, the ink supply hole 23 is sealed by the cover film 32 before the ink cartridge 11 is installed in the cartridge holder of the printer. Like the cover film 31, the cover film 32 has a two-layer structure formed of a bonding layer film and a surface layer film. A polyolefin-based film (a PO-based film) may be used as the bonding layer film. A polyethylene-terephthalate-based film (a PET-based film) may be employed as the surface layer film. When the ink cartridge 11 is mounted in the cartridge holder of the printer, the cover film 32 is penetrated by the ink supply needle 39, which is provided in the cartridge holder. In this manner, the opening 41 illustrated in FIG. 5B is formed.

As illustrated in FIGS. 3 and 4, the interior of the ink supply port 23 accommodates an annular seal member 33 formed of elastomer or the like, a supply valve 34, and a coil spring 35. The seal member 33 allows penetration of the ink supply needle of the cartridge holder into the ink supply port 23. The supply valve 34 is brought into contact with the seal member 33. The coil spring 35 urges the supply valve 34 toward the seal member 33. Specifically, the supply valve 34 is urged by the coil spring 35 to be pressed against the seal member 33, thus closing the ink supply port 23. This constantly prevents the ink from flowing from the interior of the container body 12 to the exterior through the ink supply port 23. Contrastingly, when the ink supply needle of the cartridge holder is inserted into the ink supply port 23, the ink supply needle presses the supply valve 34 inwardly in the ink supply port 23 against the urging force of the coil spring 35. The supply valve 34 is thus separated from the seal member 33. This opens the ink supply port 23, allowing the ink to flow from the interior of the container body 12 to the exterior through the ink supply port 23.

After the ink cartridge 11 is mounted in the cartridge holder of the printer, the printer consumes the ink until the ink is used up. At this stage, the used ink cartridge 11 is removed from the cartridge holder and replaced by a new ink cartridge 11. The used ink cartridge 11 is then refilled with ink and remanufactured as a reusable ink cartridge without being discarded. This contributes to efficient use of resources and preservation of environments.

A method for remanufacturing the used ink cartridge 11 will hereafter be explained with reference to FIGS. 5A to 11.

Figure 5A:
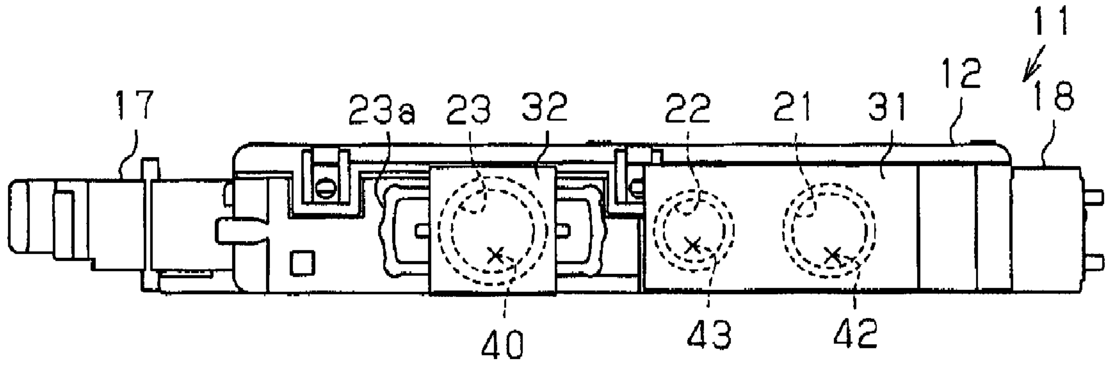
FIG. 5A is a bottom view showing the new ink cartridge.
Figure 5B:
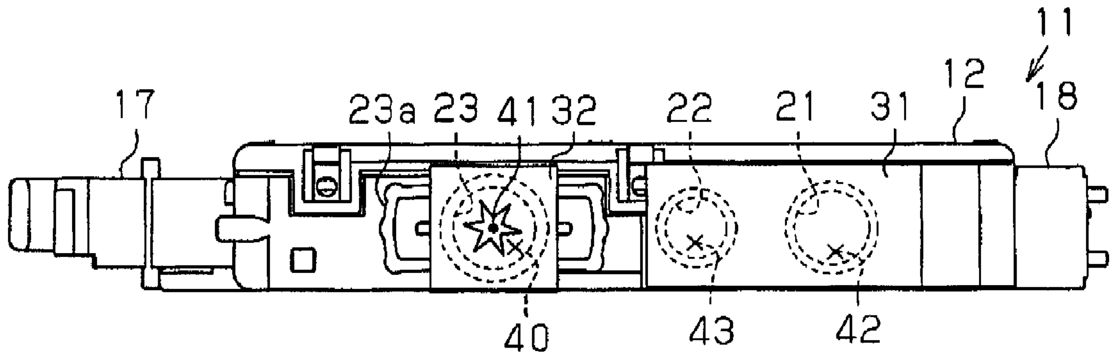
FIG. 5B is a bottom view showing a used ink cartridge.

With reference to FIG. 5A, in a new ink cartridge 11 before it is mounted in the cartridge holder of the printer, the cover films 31, 32 are welded to the lower surface of the container body 12. When removed from the cartridge holder, with reference to FIG. 5B, a used ink cartridge 11 has an opening 41 at the center of a hole covering area 40 of the cover film 32 covering the ink supply port 23. Specifically, at this stage, the cover film 32 of the ink cartridge 11 has the opening 41 communicating with the ink supply hole 23 formed in the hole covering area 40. However, there are no openings formed in hole covering areas 42, 43 of the cover film 31 covering the ink inlet holes 21, 22. In other words, the used ink cartridge 11 is recovered in the state illustrated in FIG. 5B.

To remanufacture the used ink cartridge 11 as a recovered ink cartridge, the ink cartridge 11 is arranged in a reversed posture with the lower surface of the container body 12 facing upward, as illustrated in FIG. 6. A piercing blade 46 is arranged in correspondence with the hole covering area 42 corresponding to the first ink inlet hole 21 of the cover film 31 in the vertical direction. Four blade portions 47, which extend radially from the axis of the blade 46, project from the distal end of the piercing blade 46, as viewed from the side corresponding to the distal end of the blade 46 along the axial direction of the blade 46. The blade portions 47 are spaced at regular angular intervals (which are, in the illustrated embodiment, 90 degrees each) . In this state, as illustrated in FIG. 6, the piercing blade 46 is brought closer to the lower surface of the container body 12. This causes the blade portions 47 of the piercing blade 46 to penetrate the hole covering area 42 of the first ink inlet hole 21 of the cover film 31.

The blade portions 47 thus form a cross-shaped cut extending radially from a point coinciding with the center of the first ink inlet hole 21 in the hole covering area 42 of the cover film 31. The cut forms four cantilevered cut pieces 48 having mutually identical shapes. The cut pieces 48 suspend in the first ink inlet hole 21 separately from one another in radial directions. This forms an opening 49, through which refilling of the ink is performed, in the hole covering area 42 of the first ink inlet hole 21 of the cover film 31. In other words, at this stage, the cover film 31 corresponds to a film including the opening 49, which is defined in the hole covering area 42 and communicates with the first ink inlet hole 21. Subsequently, in the same manner as the above-described manner, using the piercing blade 46, another opening 49, which communicates with the second ink inlet hole 22, is formed in the hole covering area 43 of the cover film 31 corresponding to the second ink inlet hole 22.

Next, with reference to FIG. 7, the ink introduction nozzles N are inserted into the ink inlet holes 21, 22 through the corresponding openings 49. Ink refill is thus introduced into the ink chambers 29, 30, with which the ink inlet holes 21, 22 communicate. After completion of such refilling, a laminated film 50 serving as a seal member seals the two openings 49 through which the refilling has been carried out and the opening 41 in the cover film 32 corresponding to the ink supply hole 23. In this manner, a reusable ink cartridge 11 is obtained.

Figure 8A:
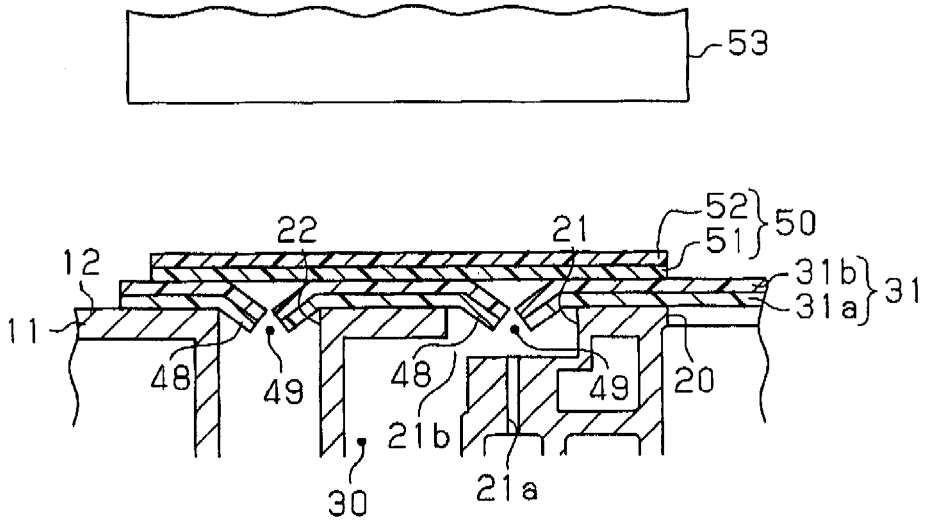
FIG. 8A is a cross-sectional view showing a portion of the container body in which a first ink inlet hole and a second ink inlet hole have been formed before a sealing step.
Figure 8B:
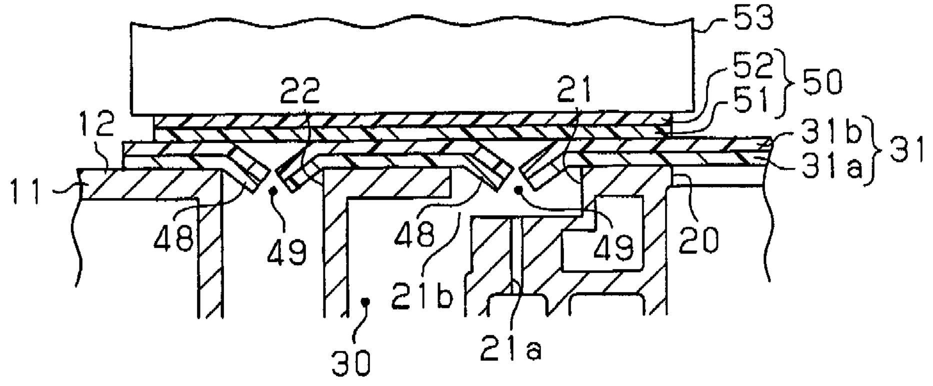
FIG. 8B is a cross-sectional view showing the portion of the container body corresponding to the first ink inlet hole and the second ink inlet hole after the sealing step.

A method for sealing the openings 49, 41 in the corresponding cover films 31, 32 will hereafter be explained with reference to FIGS. 8A and 8B. FIGS. 8A and 8B are cross-sectional views each showing the container body 12 including the first ink inlet hole 21 and the second ink inlet hole 22.

As illustrated in FIG. 8A, the laminated film 50 is mounted on the cover film 31 in such a manner as to cover the openings 49 extending through the cover film 31. The laminated film 50 has a two-layer structure including a first film 51 and a second film 52. The first film 51 is molten when heated at a predetermined temperature. The second film 52 cannot be molten at the melting temperature of the first film 51. The second film 52 has an improved heat resistance compared to the first film 51. In other words, in the laminated film 50, the first film 51 forms the outermost layer at one side of the layering directions of the films 51, 52 and the second film 52 forms the outermost layer at the other side.

With the first film 51 maintained in contact with the cover film 31 in such a manner as to cover the ink inlet holes 21, 22 and the corresponding openings 49, the laminated film 50 is placed on the container body 12. The first film 51 is thus opposed to the container body 12 while maintained in contact with the cover film 31. At this position, the first film 51 is heated to be welded to the cover film 31. Since the second film 52 is arranged at an outer side, the second film 52, which has the improved heat resistance, maintains sealing by the laminated film 50.

As the first film 51, a polyolefin-based film (a PO-based film) that melts at a predetermined temperature and exhibits improved welding performance may be employed. In other words, the first film 51 is a film formed of a resin material of the same type as the resin material forming the container body 12 of the ink cartridge 11 and the bonding layer film 31*a* of the cover film 31 but different from the type of the material forming the surface layer film 31*b* of the cover film 31. If the resin materials forming the container body 12 of the ink cartridge 11 and the bonding layer film 31*a* of the cover film 31 are films formed of ester-based resin material, an ester-based film may be used as the first film 51.

Alternatively, as the first film 51, an easy-peel-open film (an EPO film) may be employed. That is, the first film 51 may be any film selected from a cohesive-peeling type film having a single layer structure in which different types of resin materials are mixed together randomly, an interlayer-peeling type film having a multiple layered film structure in which a film layer corresponding to a support layer and a film layer corresponding to a seal layer are bonded together with low bonding strength, and an interfacial-peeling type film having a single layer structure in which bonding strength and peeling strength are adjusted by regulating the mixing rate of different types of resin materials.

If the EPO film is used as the first film 51, the laminated film 50 is bonded to the cover film 31 through welding of the EPO film. Afterward, the EPO film may be easily peeled off the cover film 31 to expose the openings 49 when necessary.

The second film 52 is formed by a polyethylene-terephthalate-based film (a PET-based film) or a nylon-based film (an NY-based film) that do not melt at the melting point of the aforementioned polyolefin-based film (the PO-based film) and have enhanced heat resistance compared to the polyolefin-based film. Further, the second film 52 is formed by a film formed of resin material of the same type as the resin material forming the surface layer film 31*b* of the cover film 31 but different from the type of the material forming the first film 51 of the laminated film 50.

The thickness of the first film 51, which is layered with the second film 52, is set to 20 to 60 μm, and, preferably, to 25 μm. By setting the thickness of the first film 51 to 20 μm or greater, formation of a gap between the second film 52 and the cover film 31 is prevented even if the bonding surface of the second film 52 to respect to the first film 51 is uneven. By setting the thickness of the first film 51 to 60 μm or less, the thickness of the first film 51 is prevented from becoming excessively great, which increases the cost and decreases heat conductivity of the first film 51 when the first film 51 is heated.

After the laminated film 50 is placed on the cover film 31, a heater 53 serving as a heating device is lowered toward the laminated film 50 from above the laminated film 50 as shown in FIG. 8B. The heater 53 is heated to a predetermined temperature that melts the first film 51 of the laminated film 50 but does not melt the second film 52. The heater 53 is shaped as a block having a flat pressing surface that contacts the surface of the laminated film 50 (the surface of the second film 52) in a surface contact manner.

Thus, with reference to FIG. 8B, when the laminated film 50 is heated by the heater 53 with the surface of the laminated film 50 held in surface contact with the heater 53, not only the annular areas around the circumferences of the openings 49 of the cover film 31 but also the covered areas of the openings 49, or the inner sides of the annular areas, are heated. This reliably melts the annular area around the circumference of each opening 49 and welds the annular area to the cover film 31, while heating the covered area of the opening 49 as well. As a result, change of the strength of the laminated film 50, or, particularly, the first film 51, induced by heating becomes uniform as a whole. This suppresses variation of the strength of the laminated film 50 in different portions.

After the first film 51 is molten through heating by the heater 53 and then cooled, the laminated film 50 is welded to the cover film 31 while in a state sealing the ink inlet holes 21, 22. In other words, the laminated film 50 seals the ink inlet holes 21, 22.

Specifically, the resin material forming the bonding layer film 31*a* of the cover film 31 is of the same type as the resin material forming the container body 12 of the ink cartridge 11. The compatibility between the bonding layer film 31*a* and the container body 12 is thus high. As a result, the bonding layer film 31*a* of the cover film 31 is firmly welded to the container body 12 of the ink cartridge 11. Contrastingly, the type of the resin film forming the surface layer film 31*b* of the cover film 31 is different from the type of the resin material forming the first film 51 of the laminated film 50. Thus, the compatibility between the surface layer film 31*b* and the first film 51 is low compared to the compatibility between the bonding layer film 31*a* and the container body 12, which are formed of the resin materials of the same type. As a result, the bonding strength of the laminated film 50 with respect to the cover film 31 is low compared to the bonding strength of the cover film 31 with respect to the container body 12 of the ink cartridge 11. Further, since the laminated film 50 is welded to the cover film 31, the laminated film 50 exhibits improved sealing performance with respect to the openings 49 defined in the cover film 31. After welding, the heater 53 is raised from the contact position illustrated in FIG. 8B to the standby position illustrated in FIG. 8A.

Figure 9:
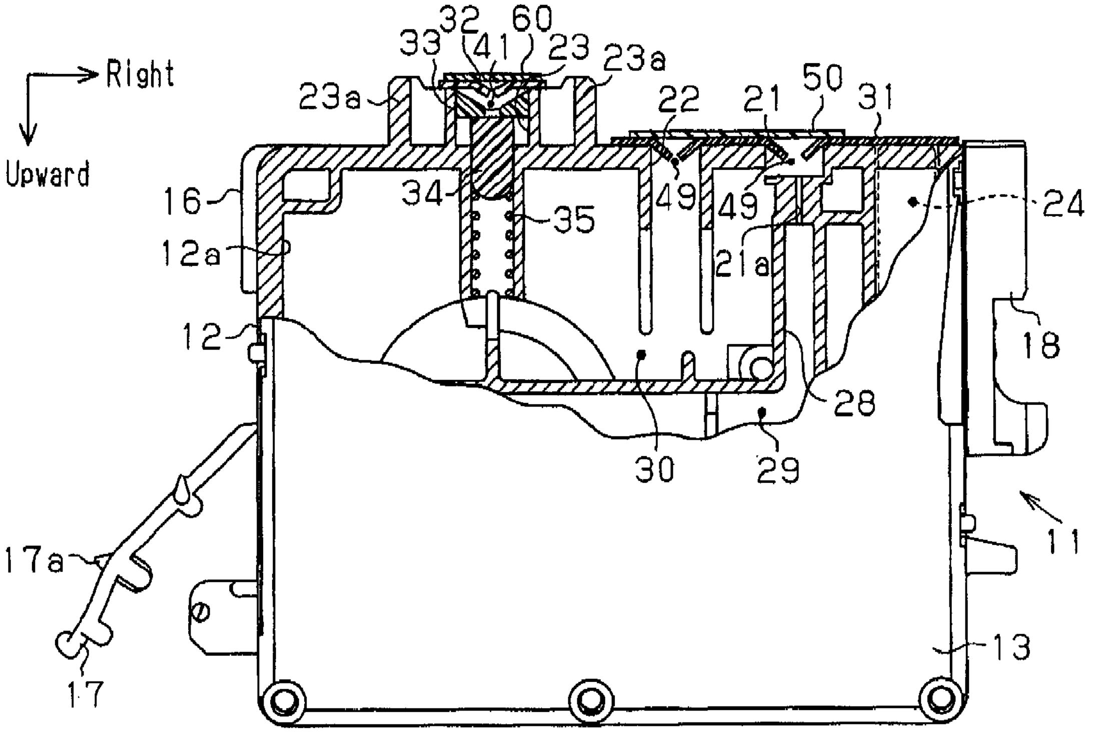
FIG. 9 is a front view, with a part cut away, showing a remanufactured ink cartridge.
Figure 10:
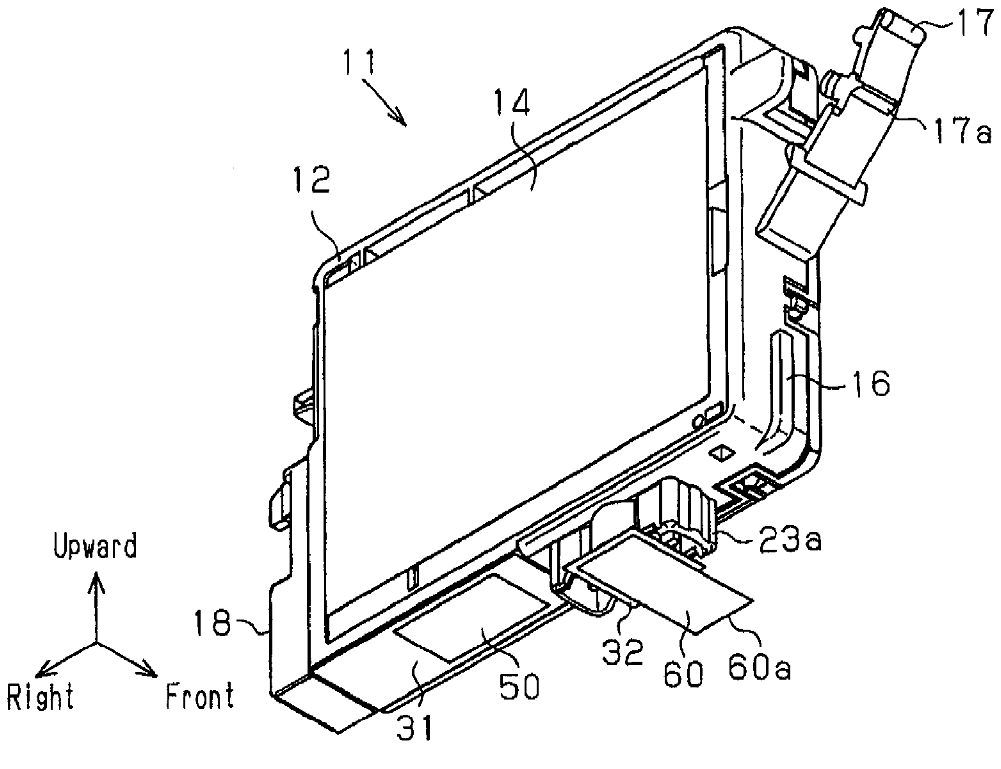
FIG. 10 is a rear perspective view showing the remanufactured ink cartridge.

Subsequently, as illustrated in FIG. 9, a laminated film 60 is mounted on the cover film 32 covering the ink supply hole 23. The laminated film 60 has a first film and a second film. The first film of the laminated film 60 is formed of the same resin material as the resin material of the first film of the laminated film 50. The second film of the laminated film 60 is formed of the same resin material as the resin material of the second film of the laminated film 50. After mounting, the laminated film 60 is welded to the cover film 32 in the same manner as the above-described manner. With reference to FIG. 10, an end of the laminated film 60, which is welded to the cover film 32 sealing the ink supply hole 23, extends sideward (forward as viewed in FIG. 9) from the container body 12 of the ink cartridge 11, thus functioning as a holding portion 60*a*. In other words, the holding portion 60*a* is a portion that is not welded to the cover film 32. Thus, the laminated film 60 is easily peeled off from the cover film 32 by means of the holding portion 60*a*.

Figure 11:
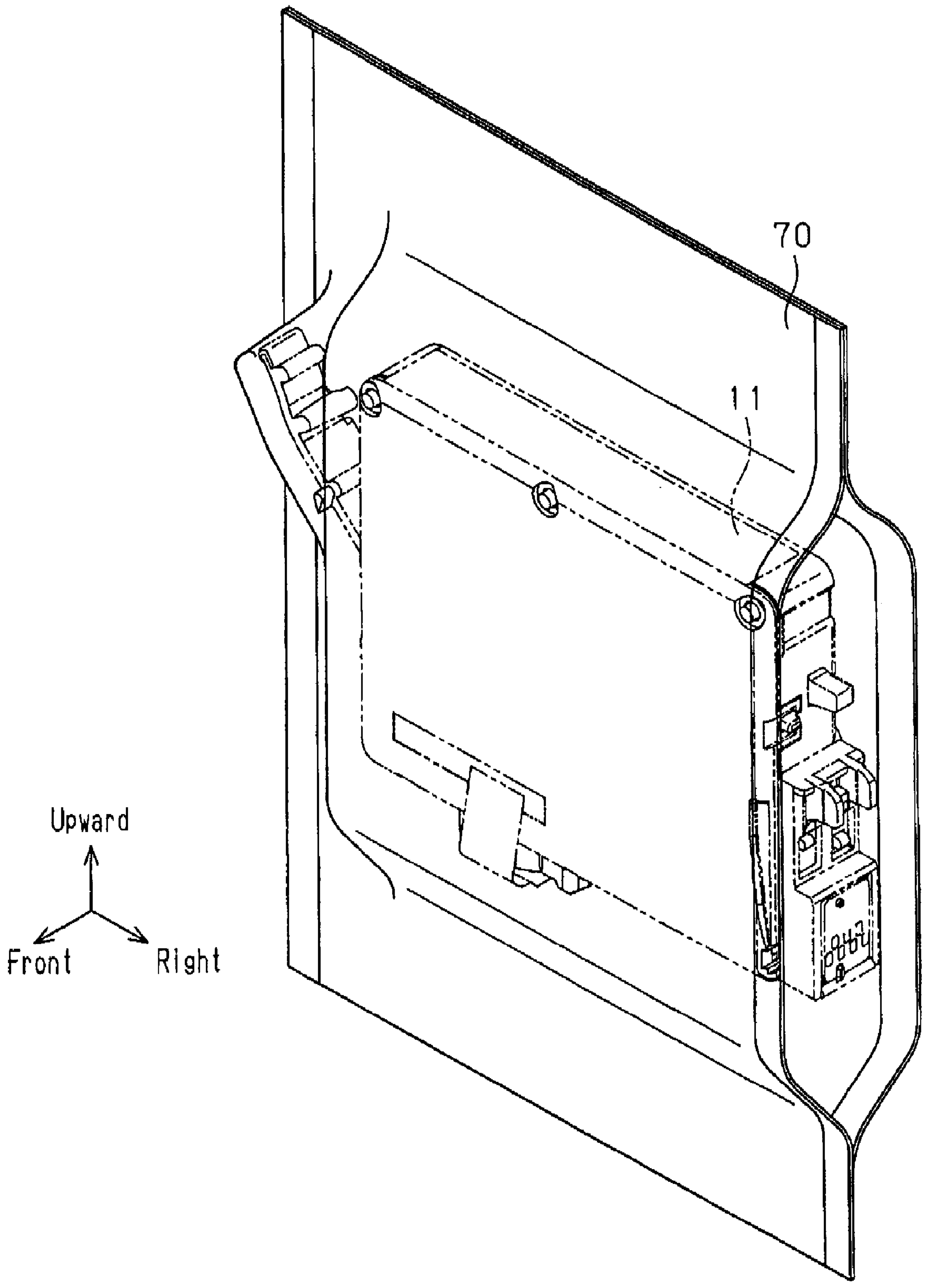
FIG. 11 is a perspective view showing the remanufactured ink cartridge in a state of being shipped.

After such sealing step, as illustrated in FIG. 5B, the used ink cartridge 11 recovered in a state in which the opening 41 is defined in the cover film 32 is provided as a remanufactured ink cartridge 11 having enhanced sealing performance. With reference to FIG. 11, the remanufactured ink cartridge 11 is accommodated in a bag 70 formed of flexible transparent resin material (such as vinyl) and shipped out in this state. As illustrated in FIG. 11, the interior of the bag 70 is maintained in a depressurized state. Thus, if the ink received in the ink cartridge 11 is in a degassed state, the level of degassing is prevented from lowering.

A method for mounting the remanufactured ink cartridge 11 in a printer and using the printer will now be described.

Figure 12B:
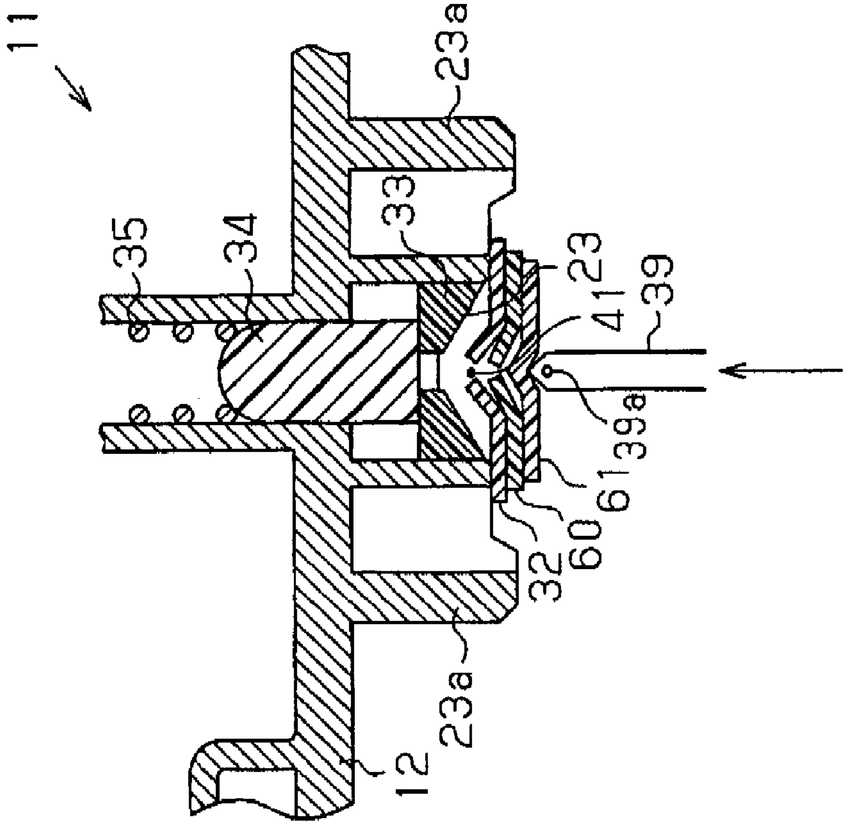
FIG. 12B is a cross-sectional view showing a portion of a comparative example of the ink cartridge shown in FIG. 12A.
Figure 12A:
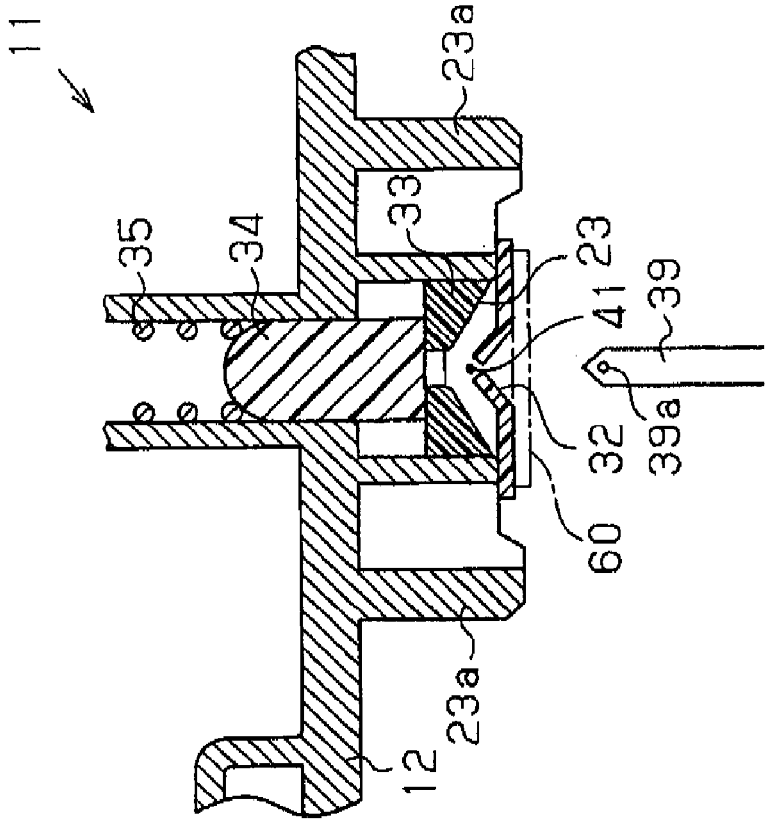
FIG. 12A is a cross-sectional view showing a portion of the remanufactured ink cartridge in the state of use.

Specifically, as illustrated in FIG. 12A, to use the remanufactured ink cartridge 11, the laminated film 60, which is welded to the cover film 32 to seal the ink supply hole 23, is peeled off from the cover film 32. That is, the laminated film 60 is removed from the ink cartridge 11 by means of the holding portion 60*a*. The bonding strength of the cover film 32 with respect to the container body 12 of the ink cartridge 11 is great compared to the bonding strength of the laminated film 60 with respect to the cover film 32. This prevents the cover film 32 from being removed from the container body 12 together with the laminated film 60.

At this stage, if the laminated film 60 is peeled off from the container body 12 together with the cover film 32 with the ink leaking from the opening side of the ink supply hole 23 through the gap between the seal member 33 and the supply valve 34, it is likely that the ink leaking from the ink supply hole 23 splashes from the ink supply hole 23 toward the exterior. However, in the illustrated embodiment, the laminated film 60 is isolated from the cover film 32, which is welded to the container body 12. This prevents the cover film 32 from causing the ink leaking from the ink supply hole 23 to splash toward the exterior.

Then, in the state illustrated in FIG. 12A, the ink cartridge 11 is mounted in the cartridge holder of the printer. The ink supply needle 39 is thus inserted into the ink supply hole 23 through the opening 41 that has been formed in the cover film 32. Thus, the ink is supplied from the ink cartridge 11 to the printer through the ink inlet hole 39*a* formed at the distal end of the ink supply needle 39.

FIG. 12B shows a case in which the laminated film 60 and a laminated film 61 are not isolated from the cover film 32, for comparative purposes. The drawing represents the remanufactured ink cartridge 11 that has been subjected to two cycles of ink refilling. That is, the laminated film 60 is the film that has been welded to the cover film 32 in the first cycle of remanufacturing and includes the opening defined when the ink cartridge 11 was mounted in the printer in the first remanufacturing cycle. The laminated film 61 is a film that has been welded to the laminated film 60 in the second cycle of remanufacturing.

When the remanufactured ink cartridge 11 shown in FIG. 12B is mounted in the cartridge holder of the printer, the ink supply needle 39 penetrates the outermost layer, or the laminated film 61, thus forming a opening in the laminated film 61. Specifically, since the laminated film 61 is flexible, the laminated film 61 is pressed by the ink supply needle 39 and thus flexibly deformed inwardly in the ink supply hole 23. The laminated film 61 is then penetrated by the ink supply needle 39. Accordingly, when mounting the ink cartridge 11 in the cartridge holder of the printer, it is necessary to apply the force required for penetrating the laminated film 61 to the ink cartridge 11 in the direction in which the ink cartridge 11 proceeds while being installed.

When the force necessary for penetrating the laminated film 61 is applied to the laminated film 61 through the ink supply needle 39, the laminated film 61 flexibly deforms inwardly into the ink supply hole 23, compressing the air in the ink supply hole 23. Thus, at the moment when the opening is formed in the laminated film 61, the compressed air may enter the inner side of the ink supply needle 39 through the ink inlet hole 39*a* of the ink supply needle 39 as bubbles. The bubbles are then sent to the printer. Further, if films having multiple cut pieces (such as the cover film 32 and the laminated film 60) are located inward from the laminated film 61, which is penetrated by the ink supply needle 39, some of the cut pieces may be caught between the ink supply needle 39 and the seal member 33. This may reduce the sealing performance between the ink supply needle 39 and the seal member 33.

In the remanufactured ink cartridge 11 of the illustrated embodiment shown in FIG. 12A, the laminated film 60 is peeled off from the cover film 32 prior to mounting of the ink cartridge 11 in the printer. This decreases the force required for installation of the ink cartridge 11 in the printer and prevents formation of bubbles in the ink supply needle 39. Further, since no cut piece of the film is caught between the seal member 33 and the ink supply needle 39 does not occur, the sealing performance between the ink supply needle 39 and the seal member 33 is maintained without lowering.

After the ink of the remanufactured ink cartridge 11 is completely consumed, the ink cartridge 11 is recovered again as a used product. The used ink cartridge 11 is then re-subjected to the remanufacturing steps illustrated in FIGS. 7 to 10 and shipped in the wrapped state shown in FIG. 11. The ink cartridge 11 is eventually mounted in the printer in the usable state shown in FIG. 12A. In this case, the remanufacturing steps do not involve the piercing step illustrated in FIG. 6. Specifically, when the remanufactured ink cartridge 11 is refilled with the ink, the laminated film 50 is isolated from the cover film 31 so that the opening 49 is exposed. The ink is then re-introduced into the ink cartridge 11 through the opening 49. Afterwards, a new laminated film 50 is welded to the cover film 31.

The illustrated embodiment has the following advantages.

(1) By welding the laminated films 50, 60 to the cover films 31, 32 to seal the ink inlet holes 21, 22 and the ink supply hole 23, the ink cartridge 11 is remanufactured while maintaining effective sealing performance. Since each of the laminated films 50, 60 is removed as needed, the laminated films 50, 60 are prevented from being formed each time the ink cartridge 11 is remanufactured. This suppresses local deformation of the outer shape of the remanufactured ink cartridge 11. The remanufactured ink cartridge 11 is thus mounted in the cartridge holder of the printer at an optimal position as in the case of a new cartridge. Further, when the used ink cartridge 11 is recovered, the cut pieces 48 around the openings 41, 49 of the cover films 31, 32 may be contaminated with used ink. However, since the ink cartridge 11 does not include the stacked seal films 60, the ink is easily washed off and removed from the cut pieces 48. This prevents the ink refill before use from being mixed with the used ink, suppressing change of the composition of the ink.

(2) The first film 51 of each laminated film 50, 60 and the surface layer film 31*b* of each cover film 31, 32, which is welded to the first film 51, are formed of resin materials of different types. Further, the bonding layer film 31*a* of each cover film 31, 32 and the container body 12, which is welded to the bonding layer film 31*a*, are formed of resin materials of the same type. Thus, the bonding strength of each first film 51 with respect to the corresponding surface layer film 31*b* is low compared to the bonding strength of each bonding layer film 31*a* with respect to the container body 12. As a result, the laminated film 50, 60 is easily isolated from the corresponding cover film 31, 32 while the cover film 31, 32 is maintained in a state bonded to the container body 12.

(3) When the laminated films 50, 60 are welded to the corresponding cover films 31, 32, the first film 51 of each laminated film 50, 60 melts but the surface layer film 31*b* of the cover film 31, 32 does not. The bonding strength of each first film 51 with respect to the surface layer film 31*b* is thus limited to a level that allows the laminated film 50, 60 to be easily peeled off from the cover film 31, 32. Further, the second film 52 of each laminated film 50, 60, which corresponds to the outer surface of the laminated film 50, 60, has high heat resistance. This maintains the sealing performance of the laminated film 50, 60 at a favorable extent.

(4) By employing an easy-peel-open film (an EPO film) as the first film 51 of each laminated film 50, 60, the laminated film 50, 60 is easily removed from the corresponding cover film 31, 32 as needed.

(5) The holding portion 60*a*, which extends sideward from the container body 12, is formed at one end of the laminated film 60. The laminated film 60 is thus easily peeled off from the cover film 32 by means of the holding portion 60*a*.

(6) Prior to installation of the remanufactured ink cartridge 11 in the printer, the laminated film 60, which has been welded to the cover film 32 to seal the ink supply hole 23, is peeled off. This decreases the force required for such installation compared to the comparative example shown in FIG. 12B, and prevents formation of bubbles in the ink supplied to the printer unlike the comparative example. Also, the sealing performance between the ink supply needle 39 and the seal member 33 is prevented from lowering.

(7) Since the remanufactured ink cartridge 11 is shipped in a state wrapped in the bag 70, the ink cartridge 11 is protected effectively.

(8) Since the interior of the bag 70 is depressurized, the level of degassing of the ink in the ink cartridge 11 is prevented from decreasing.

The illustrated embodiment may be modified as follows.

Figure 13:
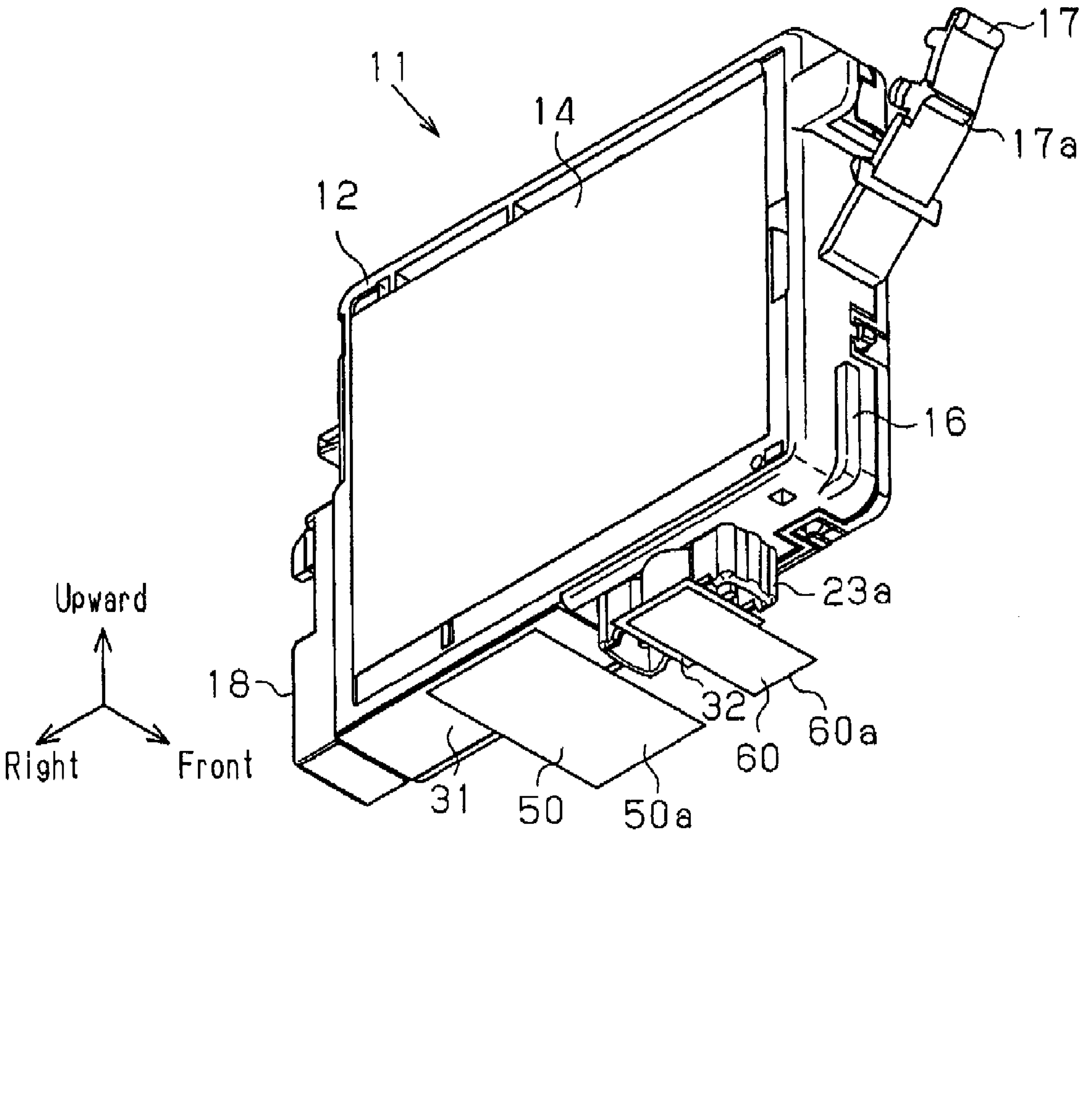
FIG. 13 is a rear perspective view showing a remanufactured ink cartridge of a modified embodiment.

As illustrated in FIG. 13, a holding portion 50*a* extending sideward from the container body 12 may be formed at one end of the laminated film 50. This structure allows the laminated film 50 to be easily isolated from the cover film 31 by means of the holding portion 50*a*. The opening 49 through which refilling of the ink is performed is thus easily exposed. As a result, the remanufacturing procedure of the ink cartridge 11 is quickly accomplished.

Figure 14:
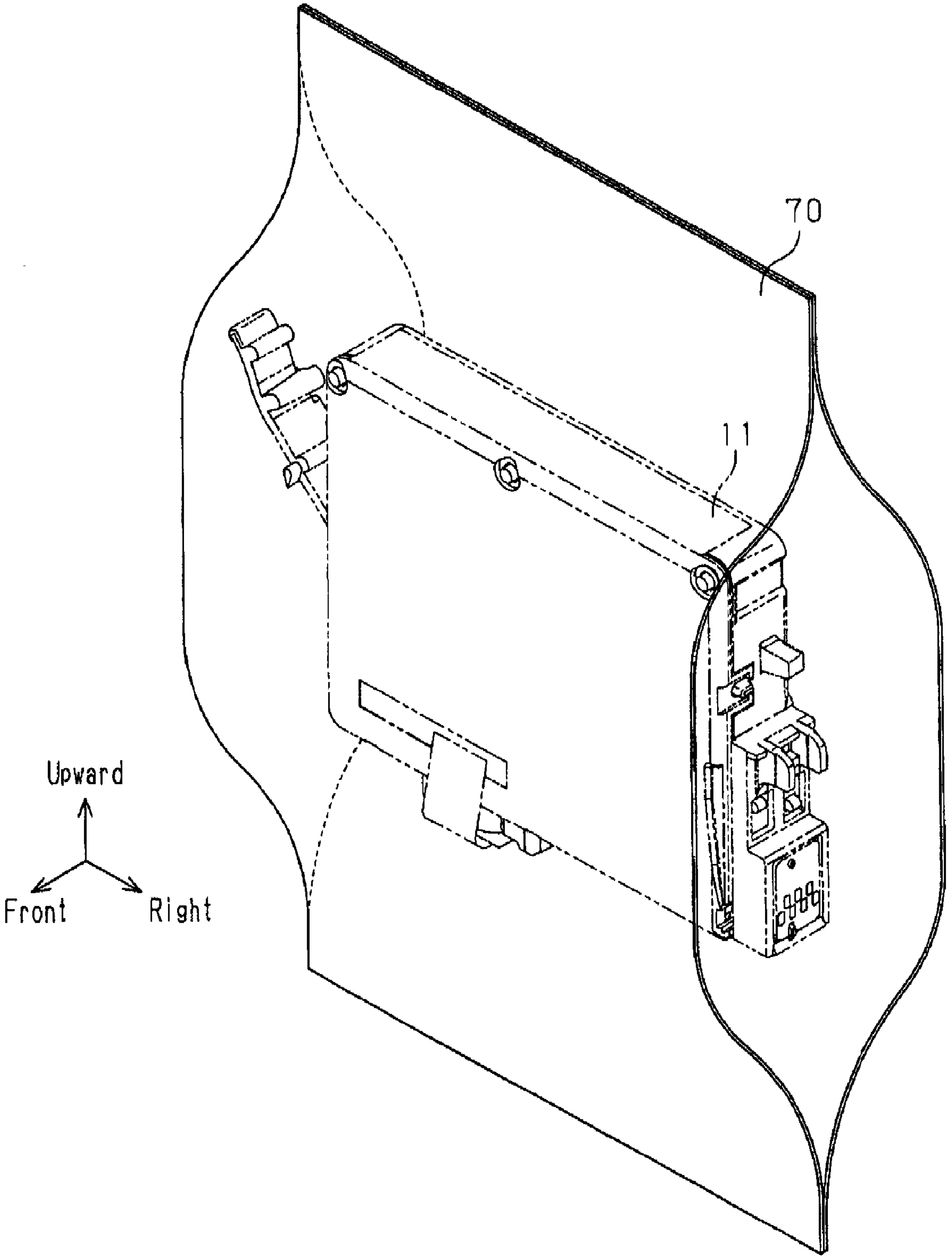
FIG. 14 is a perspective view showing the remanufactured ink cartridge of the modified example in a state of being shipped.

As illustrated in FIG. 14, the interior of the bag 70 does not necessarily have to be depressurized. Without depressurization, the bag 70 is capable of protecting the ink cartridge 11.

The remanufactured ink cartridge 11 may be shipped in the state illustrated in FIG. 10 without being received in the bag 70. Also in this case, the laminated film 50, 60 ensures effective sealing performance so that the ink is prevented from leaking from the ink inlet holes 21, 22 and the ink supply hole 23 of the ink cartridge 11.

The laminated film 50, 60 does not necessarily have to have the holding portion 50*a*, 60*a*. Specifically, the bonding strength of the first film 51 of the laminated film 50, 60 with respect to the surface layer film 31*b* is low compared to the bonding strength of the bonding layer film 31*a* with respect to the container body 12. The laminated film 50, 60 is thus easily removed even without using the holding portion 50*a*, 60*a*.

If the container body 12 of the ink cartridge 11, the bonding layer films 31*a* of the cover films 31, 32, and the first films 51 of the laminated films 50, 60 are formed of resin materials of the same type, polyolefin-based resin materials (PO-based resin materials) such as polypropylene (PP), polyethylene (PE), or polybdenum (PB) may be employed. If ester-based resin materials are selected as the resin materials of the same type forming the container body 12 of the ink cartridge 11, the bonding layer films 31*a* of the cover films 31, 32, and the first films 51 of the laminated films 50, 60, polyethylene terephthalate (PET) or polybutylene terephthalate may be employed.

The container body 12 of the ink cartridge 11, the bonding layer film 31*a* of each cover film 31, 32, and the first film 51 of each laminated film 50, 60 do not necessarily have to be formed of the resin materials of the same type. Any resin materials may be employed to form the container body 12 of the ink cartridge 11, the bonding layer films 31*a* of the cover films 31, 32, and the first films 51 of the laminated films 50, 60, as long as, for example, the films (the surface layer film 31*b* and the second film 52) to which the container body 12, the bonding layer films 31*a*, and the first films 51 are welded are formed of resin materials that melt at higher melting points than those of the container body 12, the bonding layer films 31*a*, and the first films 51.

The method for bonding each laminated film 50, 60 with the corresponding cover film 31, 32 does not necessarily have to be welding. That is, any other suitable method may be employed, as long as the bonding strength of the laminated film 50, 60 with respect to the cover film 31, 32 is low compared to the bonding strength of the cover film 31, 32 with respect to the container body 12 and ensures effective sealing performance. The laminated film 50, 60 thus may be bonded to the cover film 31, 32 using, for example, adhesive.

Only one of the laminated films 50, 60 may be welded to the corresponding one of the cover films 31, 32 at a bonding strength that is low compared to the bonding strength of the cover film 31, 32 with respect to the container body 12.

As long as the lower surface of the container body 12 of the ink cartridge 11, to which the cover films 31, 32 are welded, is formed of a material (which is, for example, synthetic resin such as polypropylene) that melts at the melting temperature of the first film 51, the portions of the container body 12 other than the lower surface may be formed of a highly heat resistant synthetic resin or metal that does not melt at the melting temperature of the first film 51.

As long as the first film 51 of the laminated film 50, 60 melts when heated by the heater 53, the first film 51 may be, for example, a urethane based film.

Each laminated film 50, 60 may have a three-layer structure including an additional film arranged between the first film 51 and the second film 52. That is, the laminated film 50 may be configured in any suitable manner as long as the outermost layer that contacts the cover film 31 is the first film 51 and the opposing outermost layer is the second film 52.

Porous material such as a sponge or unwoven fabric, which absorbs and retains ink (liquid), may be accommodated in the container body 12 of the ink cartridge 11 as ink absorbing material (liquid absorbing material). The ink retained by the ink absorbing material is supplied from the ink supply hole formed in the container body to the printer through the ink supply needle.

The used ink cartridge 11 may be refilled with ink through the ink supply hole 23, instead of the ink inlet holes 21, 22. In this case, the ink may be re-introduced through the ink supply hole 23 while the supply valve 34 is kept spaced from the seal member 33 in the ink supply hole 23 against the urging force of the coil spring 35.

In the illustrated embodiment, the liquid container is embodied by the ink cartridge. However, the liquid container may be a liquid container that contains liquid (including a liquefied body formed by dispersing or mixing functional material particles in liquid or a flowable body such as gel) other than ink. The "liquid" herein includes, for example, not only inorganic solvents, organic solvents, solutions, liquefied resins, and liquefied metals (molten metals), but also liquefied bodies, flowable bodies, and powder particulates.

What is claimed is:

1. A liquid container comprising:

a hole forming surface in which a hole is formed;

a cover film bonded to the hole forming surface in such a manner as to cover the hole, the cover film having an opening communicating with the hole; and a seal film sealing the opening of the cover film, the seal film being bonded to the cover film in such a manner that the seal film becomes peelable from the cover film, wherein the cover film is formed by stacking a plurality of films including a bonding layer film and a surface layer film, the bonding layer film being welded to the hole forming surface, the surface layer film being arranged to be exposed to the side corresponding to a surface of the cover film, wherein the seal film is formed by stacking a plurality of films including a first film and a second film, the first film being welded to the surface layer film, the second film being arranged to be exposed to the side corresponding to a surface of the seal film, and wherein the surface layer film and the second film melt at a melting point higher than the melting point of the first film and exhibit higher heat resistance than the first film.

2. The liquid container according to claim 1, wherein the cover film is welded to the liquid container, and wherein the seal film is welded to the cover film with a welding strength smaller than the welding strength of the cover film with respect to the liquid container.

3. The liquid container according to claim 1, wherein the seal film has a surface that is formed of a resin material and welded to the cover film, and wherein the cover film has a surface that is formed of a resin material of a type different from the type of the resin material of the seal film and welded to the seal film.

4. The liquid container according to claim 1, wherein the bonding layer film and the hole forming surface are formed of resin materials of a same type, and wherein the surface layer film and the first film are formed of resin materials of different types.

5. The liquid container according to claim 1, wherein the seal film has a portion that is not bonded to the cover film.

6. The liquid container according to claim 1, wherein the hole is a liquid inlet hole through which a liquid is introduced into the liquid container, and wherein the cover film has an opening formed in a portion of the cover film that covers the liquid inlet hole.

* * * * *